United States Patent
Gera et al.

(10) Patent No.: US 9,448,851 B2
(45) Date of Patent: Sep. 20, 2016

(54) SMARTER BIG DATA PROCESSING USING COLLABORATIVE MAP REDUCE FRAMEWORKS

(71) Applicant: International Business Machines Corporation, Armonk, NY (US)

(72) Inventors: Bharat K. Gera, Bangalore (IN); Shrinivas S. Kulkarni, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 13/921,569

(22) Filed: Jun. 19, 2013

(65) Prior Publication Data
US 2014/0379632 A1  Dec. 25, 2014

(51) Int. Cl.
G06F 17/30 (2006.01)
G06F 9/50 (2006.01)
G06Q 10/00 (2012.01)

(52) U.S. Cl.
CPC ............ *G06F 9/5061* (2013.01); *G06Q 10/00* (2013.01)

(58) Field of Classification Search
CPC ............... G06F 17/30007; G06F 17/30654; G06F 17/30693
USPC ................................................. 707/608, 751
See application file for complete search history.

(56) References Cited

U.S. PATENT DOCUMENTS

| | | | |
|---|---|---|---|
| 7,650,331 B1 | 1/2010 | Dean et al. | |
| 8,447,852 B1 * | 5/2013 | Penumaka et al. | 709/223 |
| 2012/0254193 A1 | 10/2012 | Chattopadhyay et al. | |
| 2012/0311581 A1 | 12/2012 | Balmin et al. | |
| 2012/0311589 A1 | 12/2012 | Agarwal et al. | |
| 2014/0156683 A1 * | 6/2014 | de Castro Alves | G06F 17/30516 707/755 |
| 2014/0195558 A1 * | 7/2014 | Murthy et al. | 707/770 |

FOREIGN PATENT DOCUMENTS

CN            102456031 A       5/2012

OTHER PUBLICATIONS

Dittrich, et al., "Efficient Big Data Processing in Hadoop MapReduce", <http://infosys.uni-saarland.de/publications/BigDataTutorial.pdf>.
Glover A., "Java development 2.0: Big data analysis with Hadoop MapReduce", Jan. 18, 2011, IBM, <http://www.ibm.com/developerworks/library/j-javadev2-15/index.html>.
Shim, K., "MapReduce Algorithms for big Data Analysis", The 38th International Conference on Very Large Data Bases, Aug. 27-31, 2012, Istanbul, Turkey. Proceedings of the VLDB Endowment, vol. 5, No. 12 , pp. 2016-2017, <http://dl.acm.org/citation.cfm?id=2367563>.
Sokol, et al., "Analytics in a Big Data Environment", IBM, Redguides for Business Leaders, This document, REDP-4877-00, was created or updated on May 17, 2012, © Copyright IBM Corp. 2012, <http://ip.com/pdf/redbook/REDP487700.pdf>.
"Apache Hadoop—Wikipedia, the free encyclopedia", As of Apr. 22, 2013, page last modified on Apr. 18, 2013, <http://en.wikipedia.org/w/index.php?title=MapReduce&oldid=549806284>.
"Map Reduce—Wikipedia, the free encyclopedia", As of Apr. 22, 2013, page last modified on Apr. 11, 2013, <http://en.wikipedia.org/w/index.php?title=Apache_Hadoop&oldid=551033926>.

* cited by examiner

*Primary Examiner* — Monica Pyo
(74) *Attorney, Agent, or Firm* — David B. Woycechowsky

(57) ABSTRACT

Map reduce processing is performed holistically, to yield map reduce results data, on an aggregated group of data sets, which had been generated and maintained with "splits" separating the separate date sets, rather than being performed separately on the split data sets and then aggregating (or attempting to aggregate) the map reduce processing results.

9 Claims, 6 Drawing Sheets

US 9,448,851 B2

SMARTER BIG DATA PROCESSING USING COLLABORATIVE MAP REDUCE FRAMEWORKS

FIELD OF THE INVENTION

The present invention relates generally to the field of "big data" processing, and more particularly to big data map reduce processing frameworks.

BACKGROUND OF THE INVENTION

Apache Hadoop is a software framework that supports data-intensive, distributed applications. (Note: the term(s) "APACHE" and/or "HADOOP" may be subject to trademark rights in various jurisdictions throughout the world and are used here only in reference to the products or services properly denominated by the marks to the extent that such trademark rights may exist.) Apache Hadoop supports execution of applications on large clusters of commodity hardware. The Apache Hadoop framework: (i) allegedly can provide data motion to applications; and (ii) implements a computational paradigm named MapReduce, where an application is divided into many small fragments of work, each of which may be executed or re-executed on any node in the cluster. In addition, it provides a distributed file system that stores data on the compute nodes. Apache Hadoop allegedly enables applications to work with thousands of computation-independent computers and quantities of data in the petabyte range. The entire Apache Hadoop platform is now commonly considered to include: (i) the Hadoop kernel; (ii) MapReduce; and (iii) Hadoop Distributed File System (HDFS). In this document, software frameworks that support distributed applications will generically be referred to as "distributed application support frameworks" (DASFs).

MapReduce is a programming model for processing large data sets. MapReduce is typically used to do distributed computing on clusters of computers. MapReduce allegedly provides regular programmers the ability to produce parallel distributed programs, by writing relatively simple Map( ) and Reduce( ) functions, which focus on the logic of the specific problem at hand. The MapReduce framework automatically takes care of: (i) marshalling the distributed servers; (ii) running the various tasks in parallel; (iii) managing all communications and data transfers between the various parts of the system; (iv) providing for redundancy and failures; and (v) overall management of the whole process. MapReduce libraries have been written in many programming languages, with a popular implementation being the above-mentioned Apache Hadoop. In this document, MapReduce (also possibly referred to as map reduce, map/reduce, or MR) shall generically refer to any programming model (now known or to be developed in the future) for processing large data sets that use Map( ) and Reduce( ) functions.

SUMMARY

According to an aspect of the present invention, a method includes the following actions (not necessarily in the following order): (i) receiving a first collaborative data set; (ii) receiving a first non-collaborative data set; (iii) combining at least the first collaborative data set and the first non-collaborative data set to make a combined map reduce (MR) data set; and (iv) performing MR processing on the combined MR data set to make MR results data.

Further aspects of the present invention are directed to similar computer systems and/or similar computer program products.

DETAILED DESCRIPTION

Figure 1:
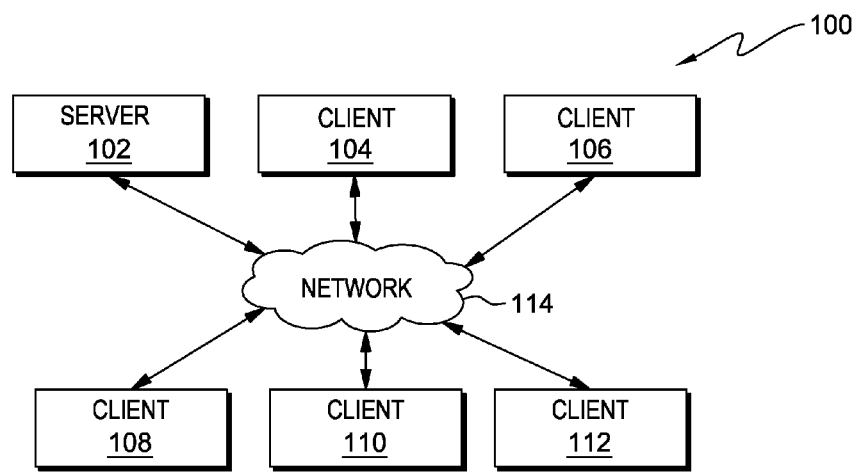
FIG. 1 is a schematic view of a first embodiment of a computer system (that is, a system including one or more processing devices) according to the present disclosure.

This DETAILED DESCRIPTION section will be divided into the following sub-sections: (i) The Hardware and Software Environment; (ii) Operation of Embodiment(s) of the Present Invention; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 2:
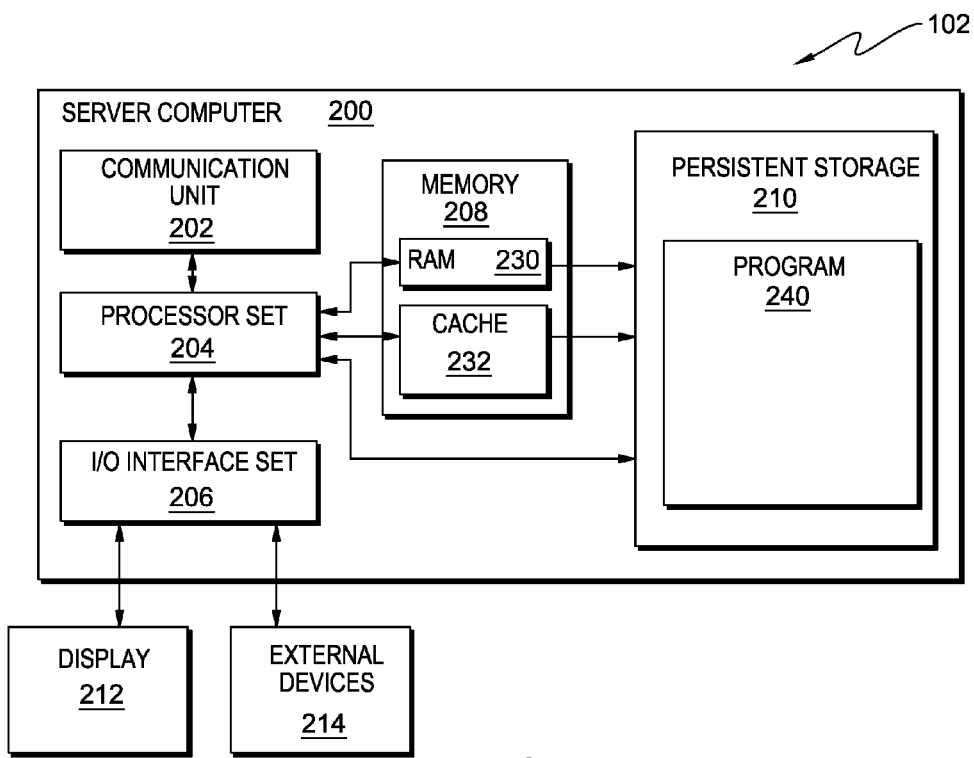
FIG. 2 is a schematic view of a computer sub-system (that is, a part of the computer system that itself includes a processing device) portion of the first embodiment computer system.

An embodiment of a possible hardware and software environment for software and/or methods according to the present invention will now be described in detail with reference to the Figures. FIGS. 1 and 2 collectively make up a functional block diagram illustrating various portions of distributed data processing system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) unit 206; memory device 208; persistent storage device 210; display device 212; external device set 214; random access memory (RAM) devices 230; cache memory device 232; and program 240.

As shown in FIG. 2, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a representative piece of software, and is a collection of machine readable instructions and data that is used to create, manage and control certain software functions that will be discussed in detail, below, in the Operation of the Embodiment(s) sub-section of this DETAILED DESCRIPTION section.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Software 240 is in many respects representative of the various software modules of the present invention and is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation of Embodiment(s) of the Present Invention

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
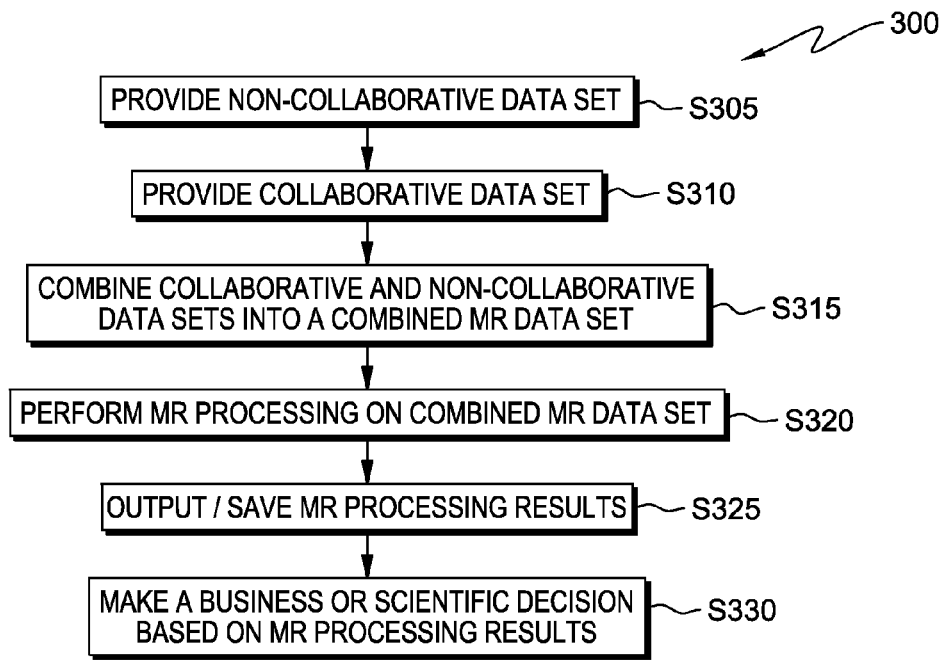
FIG. 3 is a flowchart showing a process performed, at least in part, by the first embodiment computer system.
Figure 4:
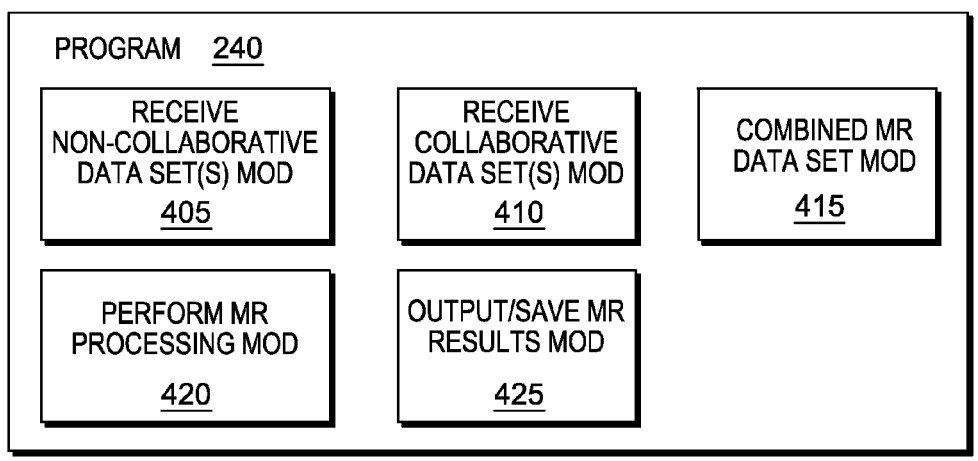
FIG. 4 is a schematic view of a portion of the first embodiment computer system.

FIG. 3 shows a flow chart 300 depicting a method according to the present invention. FIG. 4 shows program 240 for performing at least some of the method steps of flow chart 300. This method and associated software will now be discussed, over the course of the following paragraphs, with extensive reference to FIG. 3 (for the method step blocks) and FIG. 4 (for the software blocks).

Processing begins at step S305, where receive non-collaborative data set(s) module (mod) 405 receives a non-collaborative data set. In this embodiment, the non-collaborative data set is identical, in form, format and content, to a non-collaborative data set that would normally proceed directly to MR processing. However, as will be discussed below, this non-collaborative data set does not proceed directly to MR processing. In this embodiment, only a single non-collaborative data set is received at step S305. Alternatively, multiple non-collaborative data sets may be received at step S305.

Processing proceeds to step S310 where receive collaborative data set(s) module (mod) 410 receives a collaborative data set. In this embodiment, the collaborative data set is made of data collected from a social media website. Alternatively, the data could be collected from other collaborative sources. In this embodiment, the collaborative data set is identical, in form, format and content, to a collaborative data set that would normally proceed directly to MR processing. However, as will be discussed below, this collaborative data set does not proceed directly to MR processing. In this embodiment, only a single collaborative data set is received at step S310. Alternatively, multiple collaborative data sets may be received at step S310.

Processing proceeds to step S315 where combined MR data set mod 415 combines the non-collaborative data set, received at step S305, and the collaborative data set, received at step S310, and combines all the data into a single "combined MR data set" that is in a form and format so that MR processing can be performed directly upon it. In this embodiment, there is only a single non-collaborative data set and a single collaborative data set. Alternatively, in other embodiments there may be: (i) more than one collaborative data set; and/or (ii) more than one non-collaborative data set.

Processing proceeds to step S320 where perform MR processing mod 420 performs MR processing on the combined MR data set made at step S315. In this embodiment, the MR processing is of any type that is currently conventional. Alternatively, in other embodiments, the MR processing may be any type of MR processing developed in the future.

Processing proceeds to step S325 where output/save MR results mod 425 outputs and saves the results of the MR processing of step S320. In this embodiment, the output and saving are of any types of output and/or saving are of any type that is currently conventional for outputting and/or saving MR results data.

Processing proceeds to step S330 where a business person, business program, scientist or scientific program draws a conclusion about business and/or science matters based on the MR results output at step S325. In this embodiment, the conclusion is a better conclusion than what would have been concluded if separate MR processing had been separately run on the collaborative and non-collaborative data sets, respectively. This is because MR processing of a larger aggregate data set can provide better, more intelligent, more insightful results than separate MR processes run on smaller data sets that make up the aggregate data set (herein sometimes referred to as a "combined MR data set").

III. Further Comments and/or Embodiments

Figure 5:
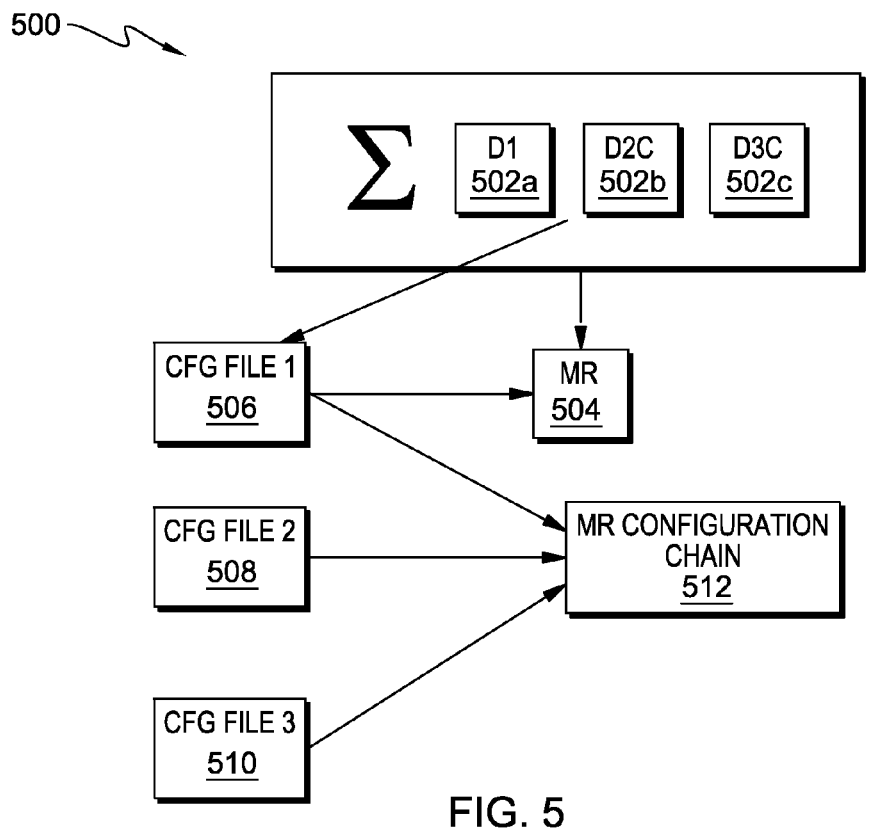
FIG. 5 is a first diagram illustrating operation of a second embodiment of a computer system according to the present disclosure.

As shown in FIG. 5, diagram 500 includes: summation block 502; MR (or map reduce) block 504; configuration file1 506; configuration file2 508; configuration file3 510; and MR configuration chain block 512. Summation block 502 includes: first data block (also called D1 block) 502a; second data block (also called D2C collaborative data block) 502b; and third data block (also called D3C collaborative data block) 502c.

Summation block 502 represents the following summation: MR=(D1+D2C+D3C . . . ). In the example of diagram 500, there is single job map reduce processing for data splits that are "collaborative generated splits," and this is true even if the collaborative generated split does not have compile time impacts. More specifically, dynamic splits are sometimes induced in a map reduce job by the collaborative framework software. When these induced splits carry collaborative information (per the configuration xml (extensible markup language)), then the induced split is referred to as a "collaborative generated split." According to some embodiments of the present disclosure, the map reduce processing input format is designed to be pluggable to the MR framework at run time, which means that the collaborative framework is a run time option that will not experience compile time impacts.

Collaborative data configured by the configuration files 506, 508, 510 is made available at runtime across collaborative nodes. These collaborative nodes are not shown in FIG. 5, but the collaborative nodes provide data from the cloud to D2C collaborative data block 502b and to D3C collaborative data block 502c. For example, in this embodiment, D3C 502c gets its constituent data from various social media website database(s) that are in and accessible through the cloud. A setting called "job configuration" points to CollaborativeInputFormat (see FIG. 6 at reference numeral 610). For example, in Hadoop, the parameter "-input format" can be used to set a resource location for the job configuration. By setting "-input format" to have the value CollaborativeInputFormat, map reduce processing will: (i) instantiate default job input format for regular split generation; and (ii) additional collaborative splits are generated based on the fact that job configuration points to CollaborativeInputFormat. MR configuration chain 512 includes the class name of the default job input format.

As shown in FIG. 5, the map reduce processing itself is performed by map reduce block 504. The map reduce processing of MR block 504 is applied to the summation of all data blocks 502a, b, c (sometimes herein referred to as a combined application of MR). In other words blocks 502a, b, c do not each have their own independent application MR respectively applied to them. Some embodiments of the present invention provide for a combined application of MR. Aggregating the results of map reduce processing performed on multiple separate data sets (that is, separate application of MR) is not generally equivalent to map reduce processing on the sum of the data sets (that is, combined application of MR). This can be expressed in math terms: MR(D1)+MR(D2)+MR(D3)+ . . . # MR(D1+D2+D3+ . . . ).

Some conditions that cause a separate application of MR to lead to different results than a combined application of MR will now be discussed. If one of the data sets is collaborative delta information only then MR(DELTA) will not produce any meaningful results under separate application of MR. Statistical business and/or scientific processing yields improved results only with larger data samples analyzed under combined application of MR. Model generation, forecasting, logistic regression, cluster analysis and the like are derived from the data volume being processed. The results are not additive for subsequent processing of the same algorithm. Also, separate application of MR requires the reduce results to be merged across the jobs. This represents a large overhead, and the functionality to aggregate the result of the separate MR processing on the separate data sets may not exist and/or may not be possible.

Some embodiments of the present invention provide one or more of the following capabilities: (i) crawling network machines and enable an "MR framework" (that is, a single data set for purposes of MR processing to pick up additional data, such as data from social media websites, local area networks and the cloud; and/or (ii) operating within an MR framework for collaborative processing, seamless schema mapping, minimal processing footprint, etc.

Figure 6:
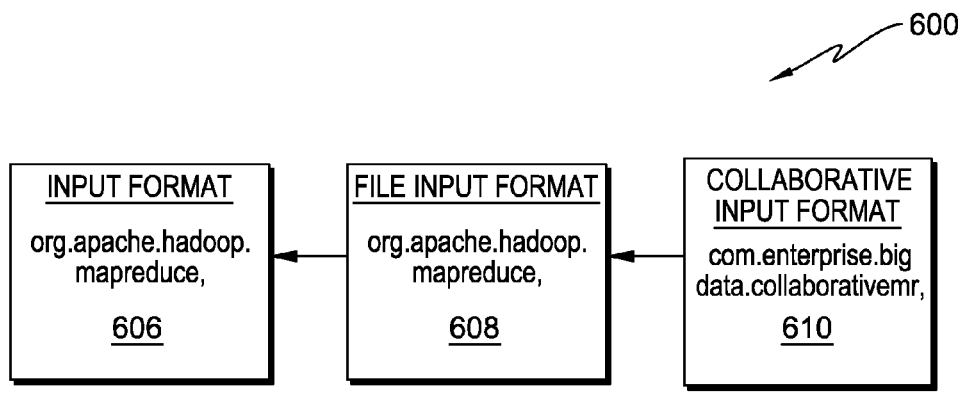
FIG. 6 is a second diagram further illustrating operation of the second embodiment computer system.

As shown in FIG. 6, diagram 600 represents a class hierarchy of collaborative input, including input format block 606; file input format block 608 and collaborative input format block 610.

An example collaborative format class definition will now be set forth as follows:

```
Package com.enterprise.bigdata.collaborativemr
    public class CollaborativeInputFormat extends
FileInputFormat <String, String> {
    FileInputFormat _defaultFormat = null;
    //constructor loads default InputFormat
    CollaborativeInputFormat( ) {
        String _clsName =
_collaborativeCfg.getConf( "defaultMapper" );
        Class _cls = Class.forName( _clsName );
        _defaultFormat =
(InputFormat)_cls.newInstance( );
    }
```

An example collaborative input format class definition will now be set forth as follows:

```
...
    //delegate all calls to the default formatter
    except getSplits
        protected long computeSplitSize(...) {
            return _defaultFormat.computeSplitSize( ) ;
        }
    ...
    List<InputSplit> getSplits(JobContext job) {
        // aggregate splits from default input format
    and
        // append splits
        List<InputSplit> _splits = new
    ArrayList<InputSplit>( );
```

A collaborative input format class definition will now be set forth as follows:

```
...
    //call default splits
    List<InputSplit> _defSplits =
super.getSplits(job);
    while ( _collaborativeCfg.getConf( ) ) {
        //generate collaborative splits from individual
configuration chain file
        //read collaborative module business logic to
generate splits
        // copy the network collaborative data to
collaborative nodes
        //transform the data per the SchemaAdaptor
        // Add to the aggregate splits
        _splits.add( new Filesplit(path, 0, splitSize,
collaborativeNode);
    ...
    } //end while
    return _splits; // return to framework
}
```

Figure 7:
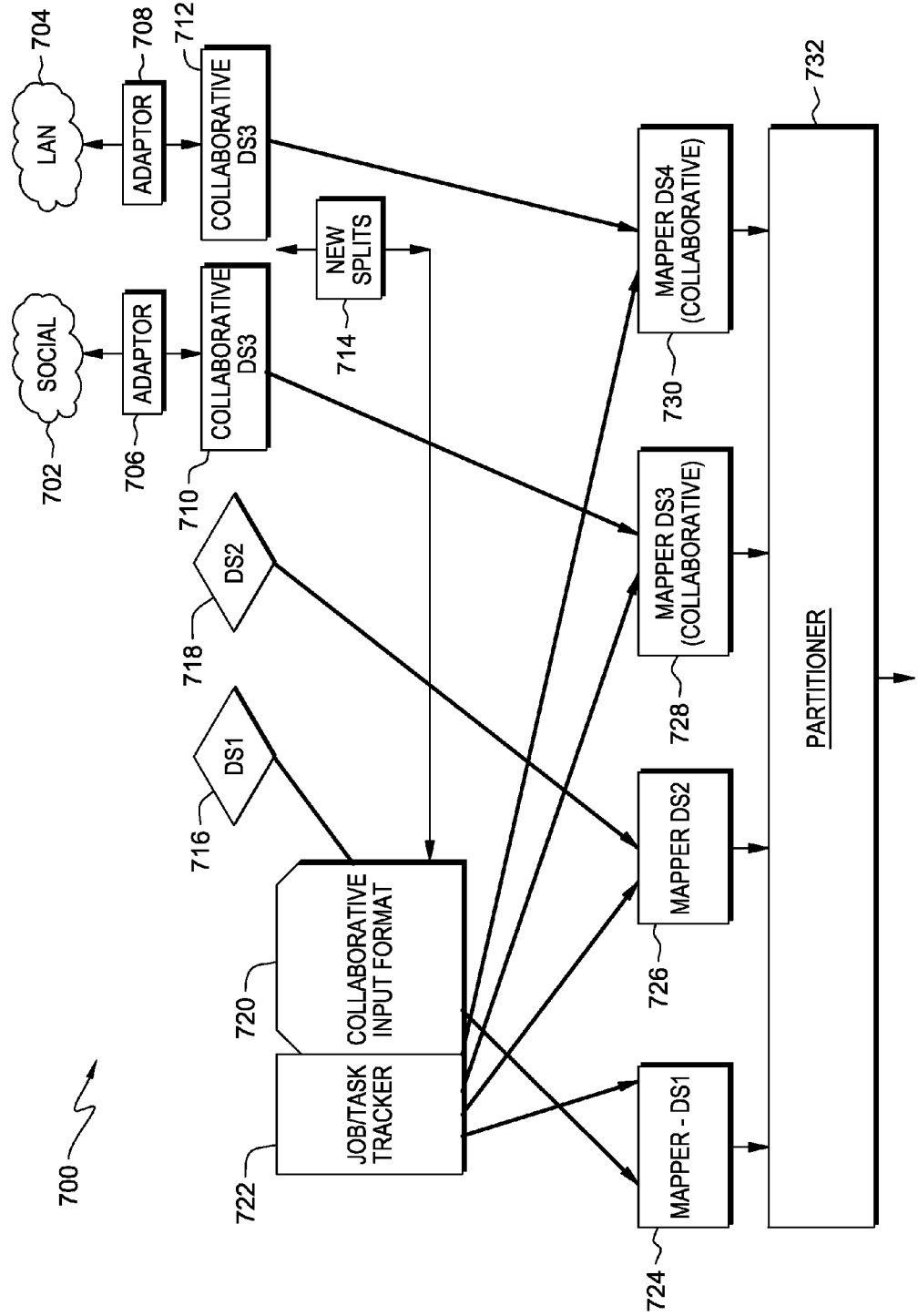
FIG. 7 is a third diagram further illustrating operation of the second embodiment computer system.

As shown in FIG. 7, architectural schematic diagram includes: social network block 702; local area network (LAN) block 704; first adaptor block 706; second adaptor block 708; collaborative DS3 first split block 710; collaborative DS3 second split block 712; new split data communication path 714; DS1 block 716; DS2 block 718; collaborative input format block 720; job/task tracker block 722; mapper DS1 block 724; mapper DS2 block 726; mapper DS3 collaborative block 728; mapper DS4 collaborative block 730; and partitioner block 732.

Collaborative DS3 first split block 710 represents a collaborative data split having dynamic contextual data that is being injected into the MR processing. This split now becomes a part of the regular MR processing in a dynamic way. Block 712 is an additional split; just like 710. There could be any number of such splits based on the collaborative configuration. Block 720 represents the dynamic plug-in into the MR framework. The plug-in is an implementation of the CollaborativeInputFormat detailed above. This plug-in is responsible for generating and processing collaborative data splits. Block 722 is a Hadoop Framework Job Tracker component that executes the MR Job. The Collaborative Plug-in is a run time configuration to the Hadoop Framework as detailed above. Blocks 724, 726, 728, 730 respectively represent mapper tasks executed by the framework. For example, block 730 is a mapper that deals exclusively with Collaborative Data Splits induced into the system. Block 732 is the Partitioner Component of the Hadoop Framework. This is a standard component executed prior to the reduce tasks. The schematic depicts that the plug-in generates the collaborative splits mapped to the Collaborative Mappers. The framework then continues with its regular processing of moving the mapper output to the Partitioner. The system flow is as usual and the collaborative logic is just a parallel sliced module at runtime without any impact to the normal processing of the framework.

Code for implementing an example of a collaborative MR operation will now be set forth:

```
$> bin/hadoop -jar mr.jar -output /disk1/op/
    -inputformat
        com.enterprise.bigdata.collaborativemr.Collabo
    rativeInputFormat
        -collaborativecfg/collab/collabmastercfg.xml
    collabmastercfg.xml
    ...
    defaultMapper=DefaultTextInputMapper
    ConfigChainPath1={
    machine:collabnode1,SchemaAdaptor:NULL,
    "/collab1/disk1/university1_election_literature" }
        ConfigChainPath2={
    machine:collabnode2,SchemaAdaptor:NULL,
    /collab2/disk2/university2_election_research" }
        ConfigChainPath3={ collabnode2,
    SchemaAdaptor:com.enterprise.bigdata.collaborativemr.T
    extAdaptor, "/collab2/disk2/WhiteHouse_LAN_Notes" }
        ConfigChainPath4={ machine:collabnode2,
    SchemaAdaptor:com.enterprise.bigdata.collaborativemr.f
    irstsocialmediasiteAdaptor, "URI:
    http://www.firstsocialmediasite.com/JohnQPublic" }
        ConfigChainPath5={ machine:collabnode2,
    SchemaAdaptor:com.enterprise.bigdata.collaborativemr.s
    econdsocialmediasiteAdaptor, "URI
    https://secondsocialmediasite.com/JohnQPublic" }
        ConfigChainPath5={ record, "{Promotion Campaign
    Uplift: 5M USD, Date: Q1 2013"} }
```

Figure 8:
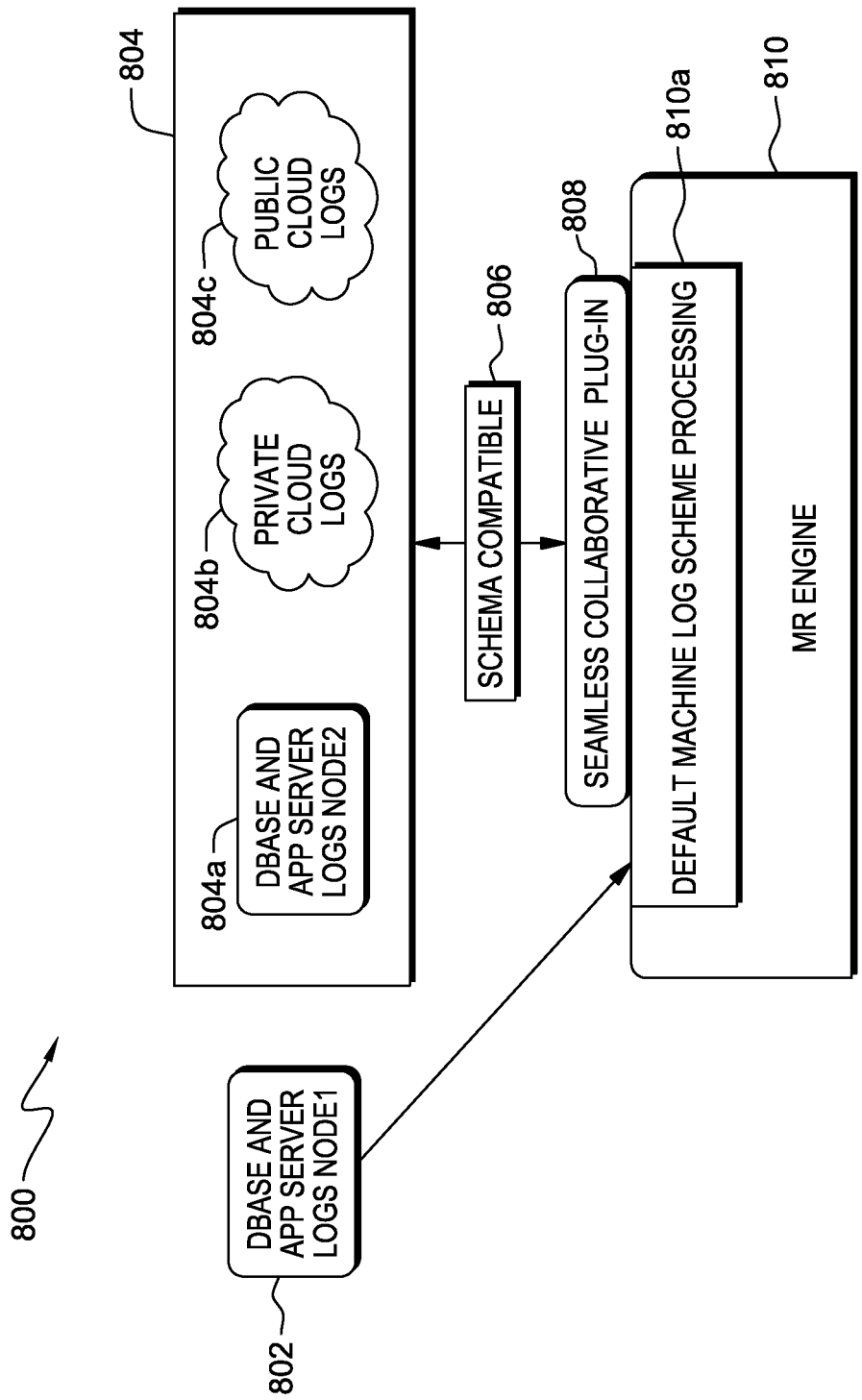
FIG. 8 is a fourth diagram further illustrating operation of the second embodiment computer system.

As shown in FIG. 8, diagram 800 shows a use case involving machine log data analytics with constant and compatible schema across collaborative sources. Diagram 800 includes database and application server logs node1 block 802; collaborative logs block 804 (including database and application server logs node2 sub-block 804a, first private cloud logs block 804b and second private cloud logs block 804c); schema compatible communication path 806; seamless collaborative plugin block 808; and MR engine block 810 (including default machine log schema processing sub-block 810a).

Seamless collaborative plugin block 808 allows the various collaborative data sets 804a, b, c to be input to the MR engine as schema compatible data sets. Default machine log schema processing block 810a combines data from database and application server logs node1 block 802 and data from seamless collaborative plugin block 808 so that the MR engine performs MR on the schema compatible single aggregated data set which includes non-collaborative data (from block 802) and multiple collaborative data sets (blocks 804a, b, c). The consistency is also in the schema of the single data set that the collaborative plug-in offers.

Figure 9:
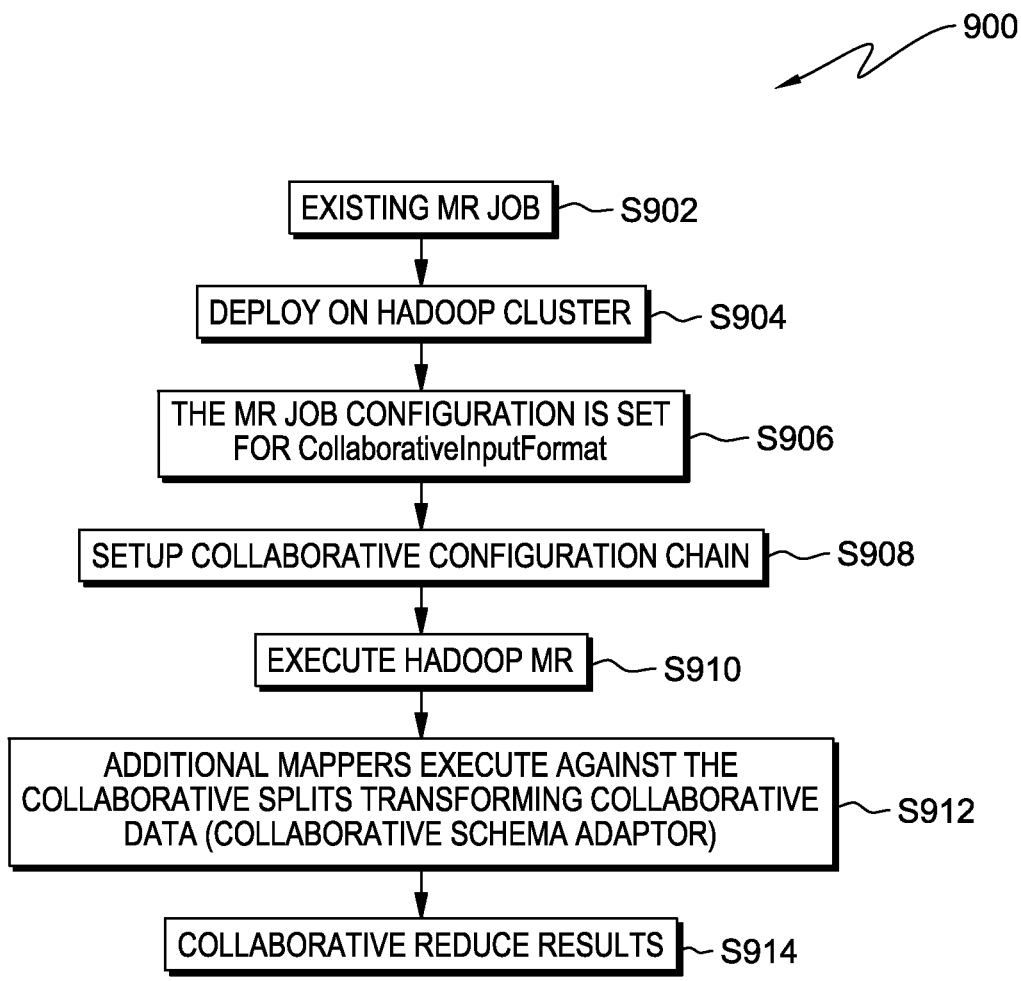
FIG. 9 is a flowchart showing a process performed, at least in part, by the second embodiment computer system.

FIG. 9 shows flowchart 900 according to the present invention. Processing begins at step S902 when an existing MR job is provided. Processing proceeds to step S904 where the MR job is deployed on a Hadoop cluster. Logical blocks of the Hadoop cluster like the trackers and partitioner are shown in FIGS. 7 and 8. An abstraction of the cluster called MR Engine is used in FIG. 8.

Processing proceeds to step S906 where the MR job configuration is set for "CollaborativeInputFormat." (See FIG. 7 at block 720 and FIG. 8 at block 808.)

Processing proceeds to step S908 where the collaborative configuration chain is set up. (See FIG. 7 at block 720 and FIG. 8 at block 808.)

Processing proceeds to step S910 where Hadoop MR is performed. This is done by an MR engine block, like MR engine 810 (see FIG. 8).

Processing proceeds to step S912 where additional mappers execute against the collaborative splits. This transforms the collaborative data and is performed by a collaborative schema adaptor. (See FIG. 7 at block 720 and FIG. 8 at block 808.) At step S914, map reduce results based on data, including data from collaborative data sets, is output and saved.

A narrative and comparative example that shows the affect that an embodiment of the present invention could have on business forecasting results will now be discussed. The marketing department of Company A plans to run a promotion that is predicted to lift demand for Company A's product by 10%. The promotion announcement impacts the demand forecast for revenue and the demand forecast for production. The forecasting central system is a "big data" deployment that is programmed to generate forecasts across divisions of Company A. If MR processing is run without consideration of collaborative data sets (that is big data processing based only upon the network map/reduce data set as an input) then the MR processing, in this example yields the following forecasts: (i) fourth quarter forecast revenue of 3.0 revenue units; and (ii) fourth quarter production at 5,000 production units.

In contrast, now assume that collaborative data sets are considered as additional inputs in the same MR process, along with the network map/reduce data set. More specifically, assume that the input to the MR process uses as an input the combination of the following: (i) the network map/reduce data set; (ii) a marketing data set collected from a social media website (which includes information regarding a promotional discount launched in the second quarter); and (iii) a Company A corporate intranet data set (which includes information about a "Promotion, Demand Uplift" for the second quarter). When the MR processing is performed on this aggregated and expanded combined data set the forecasts are as follows: (i) fourth quarter forecast revenue of 3.5 revenue units; and (ii) fourth quarter production at 6,000 production units. This is a significantly different, and likely more accurate, forecast than that set forth above based only on the network map/reduce data set.

Some embodiments of the present disclosure may have one, or more, of the following features, characteristics and/or advantages: (i) single job processing of regular and collaborative data splits (MR(D1+D2-C+D3-C+D4-C . . . ); (ii) collaborative data determined by a configuration at runtime across collaborative nodes without modifying MR framework; (iii) operates within the MR framework for collaborative processing; (iv) includes a seamless schema mapping (adaptor); (v) has a minimal processing footprint; (vi) statistical business/scientific processing yields improved results because with larger (combined) data samples can be analyzed as a single MR data set; (vii) improved model generation, forecasting, logistic regression, cluster analysis, etc.; (viii) combining multiple data sets before MR processing avoids potential problems with trying to combine results of separate MR processing on multiple data sets; and/or (ix) combining multiple data sets before MR processing avoids potentially large overhead required to combine results of separate MR processing on multiple data sets.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

User/subscriber: includes, but is not necessarily limited to, the following: (i) a single individual human; (ii) an artificial intelligence entity with sufficient intelligence to act as a user or subscriber; and/or (iii) a group of related users or subscribers.

What is claimed is:

1. A method comprising:
receiving a set of non-collaborative data split(s);
receiving a set of collaborative data split(s);
mapping, by a first set of mapper(s), data of the set of non-collaborative data split(s) to generate mapped, non-collaborative data;
mapping, by a second set of mapper(s), data of the set of collaborative data split(s) to generate mapped, collaborative data;
combining, by a partitioner running in a processor, the mapped, non-collaborative data and the mapped, collaborative data to generate mapped, combined data; and
reducing the mapped, combined data to generate combined map reduce results; the method further comprising:
setting a resource for job configuration so that map reduce processing will:
instantiate a default job input format for each non-collaborative data split of the set of non-collaborative data split(s), and
generate the collaborative data split(s) of the set of collaborative data split(s) based on a job configuration value for the job.

2. The method of claim 1 further comprising at least one of the following:
outputting the mapped, combined data; and
saving the mapped, combined data to a storage device.

3. The method of claim 1 wherein the set of collaborative data split(s) are collected from one of the following sources: a social media website, and a company intranet.

4. A computer program product comprising software stored on a software storage device, the software comprising:
first program instructions programmed to receive a set of non-collaborative data split(s);
second program instructions programmed to receive a set of collaborative data split(s);
third program instructions programmed to map, by a first set of mapper(s) data of the set of non-collaborative data split(s) to generate mapped, non-collaborative data;
fourth program instructions programmed to map, by a second set of mapper(s), data of the set of collaborative data split(s) to generate mapped, collaborative data;
fifth program instructions programmed to combine, by a partitioner, the mapped, non-collaborative data and the mapped, collaborative to generate mapped, combined data; and sixth program instructions programmed to reduce the mapped combined data to generate combined map reduce results wherein the software further comprises:

seventh program instructions programmed to set a resource for job configuration so that map reduce processing will:

instantiate a default job input format for each non-collaborative data split of the set of non-collaborative data split(s), and generate the collaborative data split(s) of the set of collaborative data split(s) based on a job configuration value for the job.

5. The product of claim 4 wherein the software further comprises at least one of the following:

eighth program instructions programmed to output the mapped, combined data; and ninth program instructions programmed to save the mapped, combined data to a storage device.

6. The product of claim 4 wherein the set of collaborative data split(s) are collected from one of the following sources: a social media website, and a company intranet.

7. A computer system comprising:

a processor(s) set; and a software storage device;

wherein:

the processor set is structured, located, connected and/or programmed to run software stored on the software storage device; and the software comprises:

first program instructions programmed to receive a set of non-collaborative data split(s), second program instructions programmed to receive a set of collaborative data split(s), third program instructions programmed to map, by a first set of mapper(s), data of the set on non-collaborative data split(s) to generate mapped, non-collaborative data, fourth program instructions programmed to map, by a second set of mapper(s), data of the set of collaborative data split(s) to generate mapped, collaborative data, fifth program instructions programmed to combine, by a partitioner, the mapped, non-collaborative data and the mapped, collaborative data to generate mapped, combined data; and sixth program instructions programmed to reduce the mapped, combined data to generate combined map reduce results, wherein the software further comprises at least one of the following:

eighth program instructions programmed to output the mapped, combined data; and ninth program instructions programmed to save the mapped, combined data to a storage device.

8. The system of claim 7 wherein the software further comprises at least one of the following:

eighth program instructions programmed to output the mapped, combined data; and ninth program instructions programmed to save the mapped, combined data to a storage device.

9. The system of claim 7 wherein the set of collaborative data split(s) are collected from one of the following sources: a social media website, and a company intranet.

* * * * *